United States Patent
Busin et al.

[11] Patent Number: 6,102,070
[45] Date of Patent: Aug. 15, 2000

[54] SAFETY VALVE FOR A CONTAINMENT CHAMBER

[75] Inventors: Michel Busin, Bondues; Remy Alnet, Equeudreville, both of France

[73] Assignee: Compagnie Generale des Matieres Nucleaires, Velizy Villacoublay, France

[21] Appl. No.: 09/029,583
[22] PCT Filed: Sep. 6, 1996
[86] PCT No.: PCT/FR96/01372
§ 371 Date: Oct. 27, 1998
§ 102(e) Date: Oct. 27, 1998
[87] PCT Pub. No.: WO97/09554
PCT Pub. Date: Mar. 13, 1997

[30] Foreign Application Priority Data

Sep. 8, 1995 [FR] France ................................ 95 10543

[51] Int. Cl.$^7$ .................................................. G05D 7/01
[52] U.S. Cl. ........................ 137/488; 137/907; 454/61
[58] Field of Search .................................. 137/488, 907; 976/DIG. 364; 454/61

[56] References Cited

FOREIGN PATENT DOCUMENTS 2617264  12/1988  France .
2119132  11/1983  United Kingdom .

*Primary Examiner*—Gerald A. Michalsky
*Attorney, Agent, or Firm*—Pearne & Gordon LLP

[57] ABSTRACT

The present invention relates to a safety valve for a containment (16) comprising a tubular body composed of a main branch (11) and a secondary branch (12) connected to said main branch (11) and opening into it via an aperture in the side of said main branch, a piston (13) mounted so that it slides inside said main branch (11) to free the said lateral aperture from the main branch, an upper stop (14) and a lower stop (15) both mounted inside the main branch and limiting the upward and downward displacement of said piston (13), the lower section of said main branch (11) being subject to a reference pressure, wherein an additional safety apparatus (25) is positioned under the tubular body between the lower section of said main branch and said reference pressure such that the maximum safety throughput rate of which the valve is capable is released in the event of an incident.

15 Claims, 3 Drawing Sheets

SAFETY VALVE FOR A CONTAINMENT CHAMBER

DESCRIPTION

1. Field of the Invention

The present invention relates to a safety valve or a containment.

2. Background Art

A glove box is a closed containment that makes it possible to handle dangerous items such as chemicals or radioactive materials. In order to protect the operator, gloves boxes are maintained in a permanent state of negative pressure in order to avoid leakage of dangerous materials to the exterior of the glove box. The negative pressure inside glove boxes is regulated such as to remain between an upper and a lower threshold.

A containment generally comprises two ventilation circuits:

a standard permanent sweep circuit, a safety circuit that normally has no throughput but provides additional extraction in the event of a leak in the confinement; the aim of this additional extraction is to ensure that the leak in the confinement is met by a dynamic confinement by forcing air into the confinement at a velocity of the order of 0.5 m/s.

The valve of the invention is designed to be fitted to this type of safety circuit.

A safety circuit is designed to limit variations in absolute pressure caused inside a containment in the event of:

extraction filters becoming clogged, movements of the gloves, pressure variations in the general extraction system, etc.

In the event of a rapid, significant variation in relation to the reference pressure, and depending on the design and state of the ventilation system parameters, the safety circuit may also ensure all or part of the safety flow rate.

The ON/OFF circuit contributes to attaining the safety throughput rate in the event of an unexpected breach of the containment, if, for example, a glove breaks off.

While the gloves are being used under normal conditions this type of circuit should never open, even fleetingly, in order to preserve the filters. It must instantaneously ensure the safety throughput rate in the event of a leak.

Safety circuits of the known art may be fitted with the standard valve shown in FIG. 1, fitted with a lightweight piston to limit unwanted opening while the gloves are being used.

This type of valve 10 comprises:

a tubular body composed of a main branch 11 and a secondary branch 12 opening into the main branch 11, a movable piston 13 that slides inside the main branch of the body of the valve; depending on the operating mode required, the piston may be weighted or not, two O-rings 14 and 15 act as stops and ensure leak tightness.

A containment under negative pressure 16, for example a glove box, is connected to an extraction collector 17 via piping 18 comprising a filter 19. Valve 10 described above is incorporated into the said piping. The upper section 20 of the main branch is connected to containment 16 via piping 18 and the lower section 21 of the main branch is subject to a reference pressure, for example atmospheric pressure, via a filter 22. Secondary branch 12 is connected to extraction collector 17.

The valve 10 controls the regulation of negative pressure above piston 13. If the negative pressure in the containment is reduced, the piston drops and connects the containment to extraction collector 17 until normal negative pressure is re-established. If the negative pressure of the containment rises the opposite happens. For a given negative pressure the extraction throughput rate required inside the containment is obtained by adjusting the internal weighting of the piston.

However, when the containment is breached piston 13 descends but does not travel its entire course, being too light; this limits the rate extracted. When, however, a high safety throughput rate is required several valves must be connected in parallel.

The balance of piston 13 is the result of the equilibrium between two directly opposed vertical forces:

the downward-tending weight of the piston, the upward-tending force on the upper bearing surface of the piston resulting from the pressure difference on the bearing surfaces of the piston.

The lower bearing surface of the piston is in contact with the ambient air and is subject to no force. The negative pressure of the system downstream of the valve has equal effects on the top and bottom of the piston and the resultant is therefore nil.

In normal operation, therefore, the negative pressure in containment 16 is applied to the upper bearing surface. The resultant is greater than the weight of piston 13 that thus remains in the upper position with a nil safety flow rate. When, however, the gloves are used the negative pressure inside the containment 16 varies such that when the resultant is less than or equal to the weight of piston 13 there is a partial drop of the piston causing a transient safety flow. This problem may be limited by lightening the weight of the piston.

In the event of an incident the negative pressure in containment 16 tends towards zero. The resultant on the lower bearing surface of piston 13 becomes less than its weight, causing valve 10 to open and the safety flow to be established. However, this flow causes head loss in the circuit between the top of piston 13 and containment 16 of the order of −30 daPa depending on the pipework and the filters. These head losses create a residual negative pressure that limits the descent of the piston and therefore the throughput rate. This phenomenon may be limited by increasing the weight of the piston, but this is the precise opposite of the desired result.

An example of this type of safety device for controlling the pressure in a containment under negative pressure, a glove box for example, is described in French patent No. 2 617 264, filed on Jun. 25, 1987.

This patent relates to a safety valve for a containment under negative pressure that comprises a tubular body consisting of a main branch and a secondary branch connected to the said main branch and opening into it via an aperture in the side of said main branch, a piston mounted so that it slides inside said main branch, to free the said lateral aperture from the main branch, having a stop located inside the main branch that limits the upward displacement of the said piston in the position in which it fully closes the lateral aperture, the lower section of said main branch being closed by a base that has a central aperture subject to a reference pressure, a capillary channel connecting an area of the main branch located near the lateral aperture on the side nearest the bottom with an area located near the bottom of this branch, said piston comprising means for closing the central aperture in the bottom.

However, this valve has many operating drawbacks such as those outlined above.

In order to overcome the various drawbacks of the apparatuses of the prior art, the invention aims to produce a safety valve capable, in the event of an incident, of releasing the maximum safety throughput rate of which the valve is capable.

DISCLOSURE OF THE INVENTION

The present invention relates to a safety valve for a containment comprising a tubular body composed of a main branch and a secondary branch connected to said main branch and opening into it via an aperture in the side of said main branch, a piston mounted so that it slides inside said main branch, to free the said lateral aperture from the main branch, an upper stop and a lower stop both mounted inside the main branch and limiting the upward and downward displacement of said piston, the lower section of said main branch being subject to a reference pressure, characterized in that an additional safety apparatus is positioned under the tubular body between the lower section of said main branch and said reference pressure.

The additional safety apparatus is advantageously screwed underneath the valve. A variant of the invention has been designed, tested and installed in which the additional safety apparatus and the standard valve were combined in a single part. This variant is in the form of a hollow cylinder provided with a cylindrical cavity in which a piston slides between two O-rings that act both as mechanical stops and leaktight seals. The piston used is lightweight and has wide bearing surfaces. The lower section of the cylinder is screwed onto a cap. Leaktight seals are disposed between the valve and the cylinder, and between the cylinder and the cap respectively.

The upper section of the main branch is capable of being connected to a containment under negative pressure via a filter, and the secondary branch is capable of being connected to an extraction collector.

A first pipe is disposed between the containment and the top of the cavity. A second pipe is disposed between the upper section of the main branch located above the upper seal and the central section of the cavity, located between the two seals. A third pipe is disposed between the bottom of the lower section of the main branch and the central section of the cavity located between the two seals. A fourth pipe is disposed between the central section of the cavity located between the two seals and the lower section of this cavity.

The third and fourth pipes are advantageously included within the body of the cylinder of the additional safety apparatus or outside it.

In one advantageous application the containment under negative pressure is a glove box, gripper box, etc.

The pistons are made as light as possible in order to limit the sensitivity of the valve of the invention to variations in negative pressure due to the gloves.

DETAILED DESCRIPTION OF EMBODIMENTS

Figure 1:
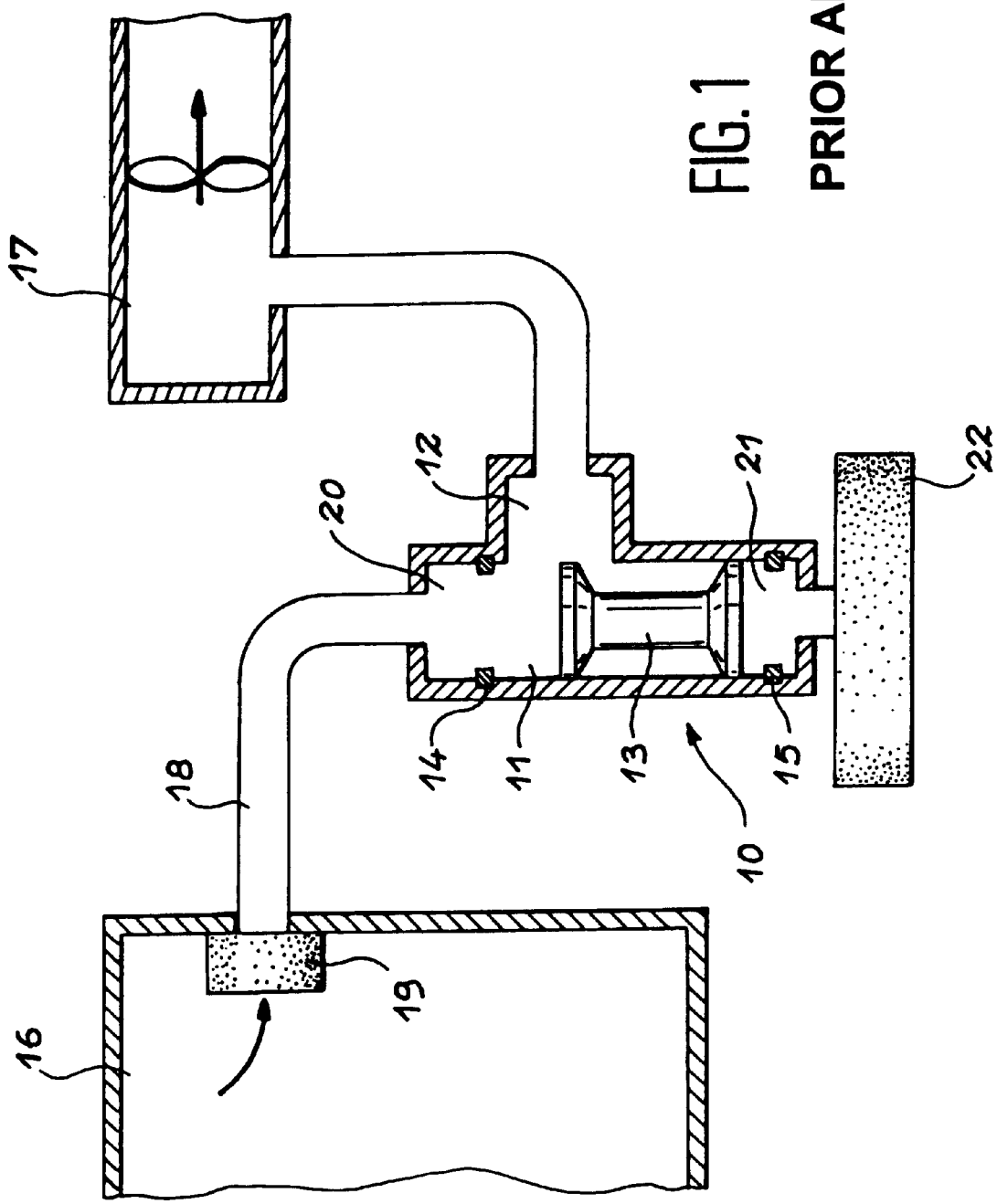
FIG. 1 shows a diagrammatic view of a control valve according to the prior art.
Figure 2:
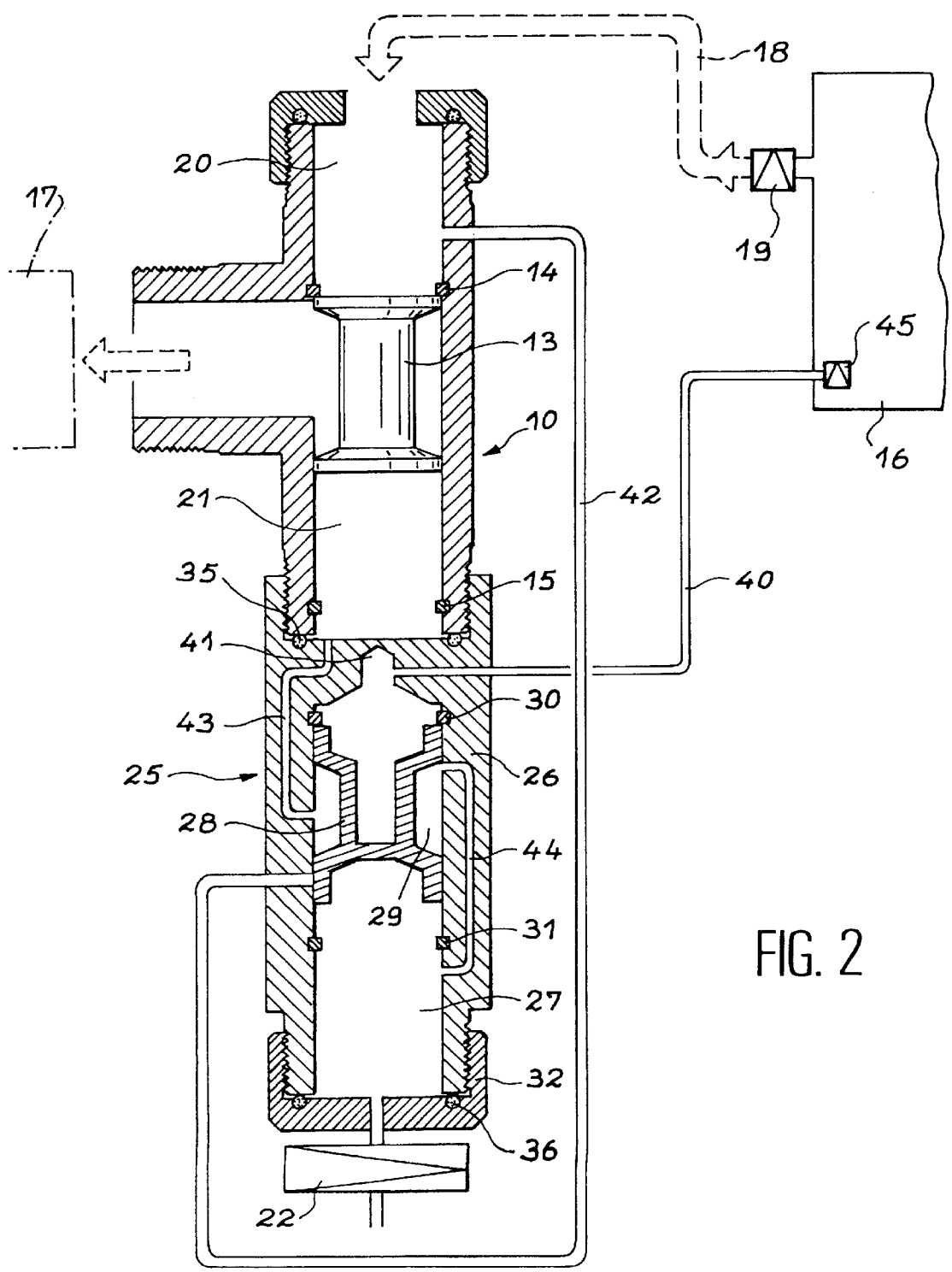
FIGS. 2 and 3 show a diagrammatic view of a valve according to the invention, respectively during normal operation and during operation during an incident.
Figure 3:
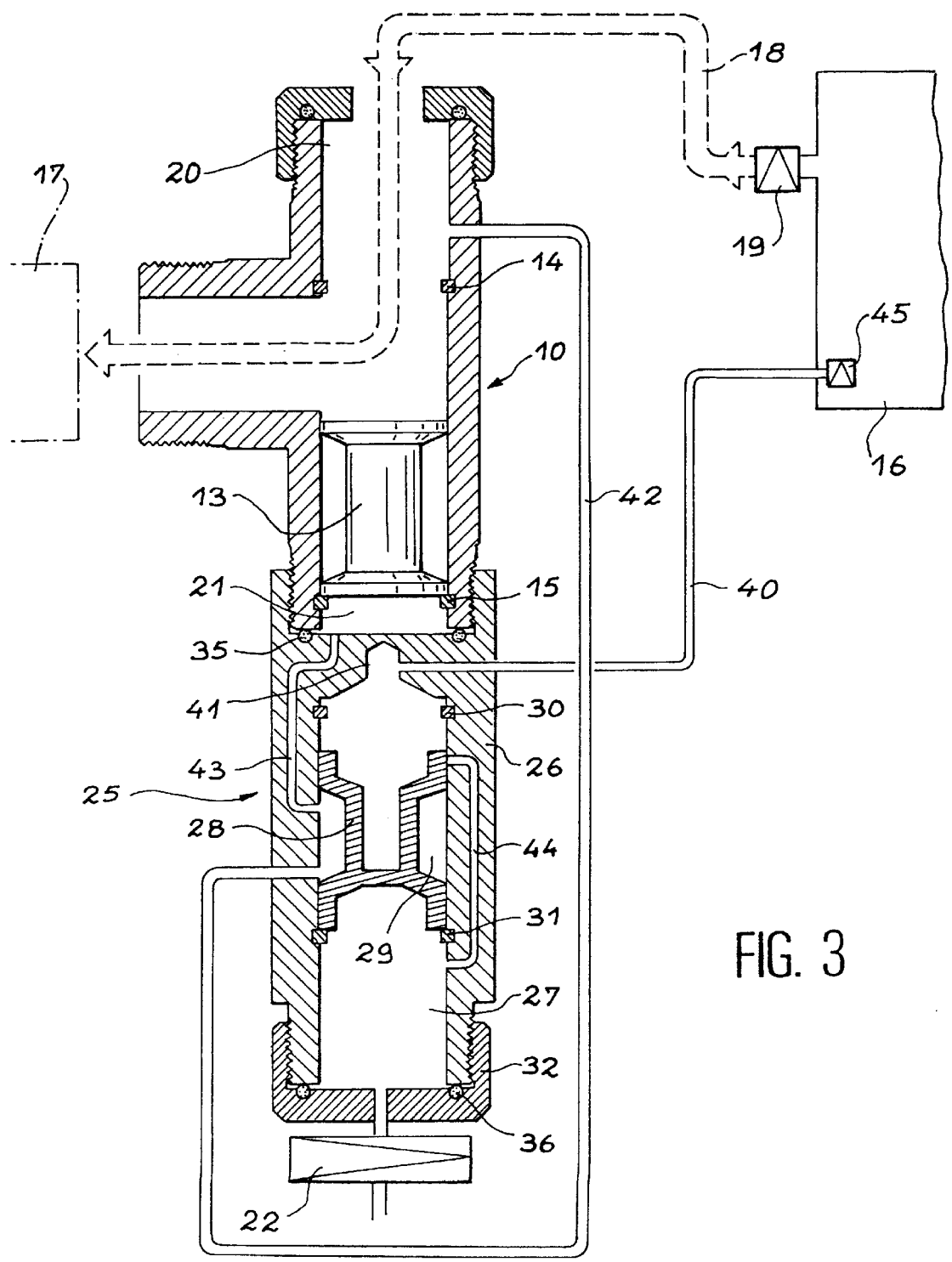

As shown in FIGS. 2 and 3, the valve of the invention includes an additional safety apparatus 25 fastened, for example by screwing, under safety valve 10 as shown in FIG. 1.

In one variant, safety valve 10 and additional safety apparatus 25 are combined in a single part.

Additional safety apparatus 25 forces piston 13 to open fully in the event of the confinement leaking, which would result in a major increase in the flow passing through the valve 10.

The additional safety apparatus is in the form of a hollow cylinder 26 provided with a cylindrical cavity 27, itself containing a piston 28 and fastened to the lower section of safety valve 10.

Like the piston of safety valve 10, piston 28 is leaktight and sealless but comprises elongated skirts that form a peripheral annular opening 29 that enables it, together with the internal pipes, to act as a distributor.

The lower section of the cylinder communicates with the ambient room pressure via a filter 22 that may be of the type used in pressurized diving suits.

Piston 28 is capable of sliding between O-rings 30, 31 that act as both stops and leaktight seals.

Advantageously, said piston is lightweight and has wide bearing surfaces.

The lower section of cylinder 26 is screwed onto cap 32.

Leaktight seals 35 and 36 are respectively disposed between safety valve 10 and cylinder 26, and between cylinder 26 and cap 32.

A first pipe 40 connects containment 16 with the upper section 41 of cavity 27 via a filter 45.

A second pipe 42 is disposed between the upper section 20 of the main branch located above upper seal 14 and the central section of cavity 27 located between the two seals 30 and 31.

A third pipe 43 is disposed between the bottom of lower section 21 of the main branch and the central section of cavity 27 located between the two seals 30 and 31.

A fourth pipe 44 is disposed between the upper part of the central section of cavity 27 located between the two seals 30 and 31 and said cavity 27.

The last two pipes 43 and 44 are advantageously included within the body of the cylinder 26 of the additional safety apparatus 25 of the invention.

Piston 28 is caused to move by the negative pressure of containment 16 that is applied by means of a flowless branch connection to said containment 16.

Piston 28 of the additional safety apparatus acts as a distributor that applies either the ambient pressure of the room or the same negative pressure as that acting on the upper bearing surface of piston 13 to the lower bearing surface of piston 13.

As can be seen in FIG. 2, in normal operation the first and second pistons 13 and 28 press against upper stops 14 and 30. The outlet to extraction collector 17 is closed by first piston 13. One end of pipe 42 is closed by second piston 28.

The third and fourth pipes 43 and 44 open into the peripheral annular opening 29 of the second piston 28, thereby connecting lower section 21 of the main branch and the lower section of cavity 27.

In normal operation, therefore:

the upper bearing surface of piston 13 of safety valve 10 is subject to the negative pressure of containment 16, the upper bearing surface of piston 28 of additional safety apparatus 25 is also subject to the negative pressure of containment 16 while its lower bearing surface is subject to the ambient room pressure; since the resultant negative pressure is greater than its weight, piston 28 is sucked upwards. The pipes enable the piston in this position to apply the ambient room pressure to the lower bearing surface of piston 13 of safety valve 10; since the resultant negative pressure is greater than its weight, piston 13 is maintained in the high position, thereby preventing any flow, pistons 13 and 28 are made as light as possible in order to limit the sensitivity of the system to variations in pressure caused by movements of the gloves.

In practice, manufacturing constraints mean that the trigger threshold cannot be greater than −11 daPa relative to the ambient room pressure.

As shown in FIG. 3, in the event of an incident the two pistons 13 and 28 rest on lower stops 15 and 31. In this situation, containment 16 is connected to extraction collector 17 via pipe 18.

Second and third pipes 42 and 43 are connected to peripheral annular opening 29 of second piston 28, connecting upper section 20 of the main branch and the lower section 21 of said main branch. Piston 28 closes one end of fourth pipe 44.

In the event of an incident negative pressure inside containment 16 tends towards zero.

The negative pressure on the upper surface of piston 28 of additional cylinder 25 tends towards zero. Piston 28 drops under the effect of its own weight. The pipes ensure that the residual negative pressure above piston 13 of safety valve 10 is also applied to the lower bearing surface of piston 13 which in turn drops its entire travel under the effect of its own weight, freeing the entire extraction section and thereby permitting the maximum flow the circuit will allow.

What is claimed is:

1. Safety valve for a containment comprising a first tubular body composed of a main branch and a secondary branch connected to said main branch and opening into it via an aperture in the side of said main branch, a piston mounted so that it slides inside said main branch, to free the said lateral aperture from the main branch, an upper stop and a lower stop both mounted inside the main branch and limiting the upward and downward displacement of said piston, the lower section of said main branch being subject to a reference pressure, wherein an additional safety apparatus comprising a second tubular body is positioned under the first tubular body between the lower section of said main branch and said reference pressure, and a pipe connected to the first tubular body above the lower section of the main branch wherein the second tubular body provides a valve member closably communicating the lower section of the main branch with the pipe.

2. Safety valve of claim 1 wherein said apparatus is in the form of a hollow cylinder provided with a cylindrical cavity in which a second piston fitted with a peripheral annular opening slides between two O-rings that act both as mechanical stops and leaktight seals.

3. Safety valve of claim 2 wherein the second piston is lightweight and has wide bearing surfaces.

4. Safety valve of claim 2 wherein the lower part of cylinder is screwed onto a cap.

5. Safety valve of claim 4 wherein leaktight seals are disposed between the valve and the cylinder, and between the cylinder and the cap respectively.

6. Safety valve of claim 2 wherein a first pipe is disposed between the containment and the top of the cavity, wherein a second pipe is disposed between the upper section of the main branch located above the upper stop and the central section of the cavity, located between the two seals, wherein a third pipe is disposed between the bottom of the lower section of the main branch and the central section of the cavity located between the two seals, and wherein a fourth pipe is disposed between the central section of the cavity located between the two O-rings and the lower section of this cavity.

7. Safety valve of claim 6 wherein the third and fourth pipes are conduits bored in the body of the cylinder of additional safety apparatus.

8. Safety valve of claim 2 wherein the pistons are as lightweight as possible.

9. Safety valve according to claim 2 wherein the safety apparatus forces the piston to open fully in the event of a leak in the containment.

10. Safety valve of claim 1 wherein additional safety apparatus is screwed onto the main branch.

11. Safety valve of claim 1 wherein the safety valve and additional safety apparatus are combined in a single part.

12. Safety valve of claim 1 wherein the upper section of the main branch is capable of being connected to a containment under negative pressure via a filter, and the secondary branch is capable of being connected to an extraction collector.

13. Safety valve of claim 1 wherein containment is a glove box.

14. Safety valve according to claim 1 wherein the second tubular body is removably attached to the first tubular body.

15. Safety valve according to claim 1 wherein the safety apparatus forces the piston to open fully in the event of a leak in the containment.

* * * * *